(12) United States Patent
Hicks et al.

(10) Patent No.: US 10,141,776 B2
(45) Date of Patent: Nov. 27, 2018

(54) DISTRIBUTION OF POWER COMMANDS IN AN ENERGY STORAGE SYSTEM

(71) Applicant: General Electric Company, Schenectady, NY (US)

(72) Inventors: Charles Clarence Hicks, Loudonville, NY (US); Kenneth McClellan Rush, Ballston Spa, NY (US); Joshua Paul Webb, Schenectady, NY (US); Richard Scott Bourgeois, Albany, NY (US)

(73) Assignee: General Electric Company, Schenectady, NY (US)

( * ) Notice: Subject to any disclaimer, the term of this patent is extended or adjusted under 35 U.S.C. 154(b) by 214 days.

(21) Appl. No.: 15/186,798

(22) Filed: Jun. 20, 2016

(65) Prior Publication Data

US 2017/0366037 A1 Dec. 21, 2017

(51) Int. Cl.
*H02J 3/46* (2006.01)
*H02J 7/34* (2006.01)

(52) U.S. Cl.
CPC ..................................... *H02J 7/34* (2013.01)

(58) Field of Classification Search
USPC ............................................. 307/18, 24, 51
See application file for complete search history.

(56) References Cited

U.S. PATENT DOCUMENTS

| | | | |
|---|---|---|---|
| 2,386,638 A * | 10/1945 | Spencer | H04M 19/00 290/30 B |
| 6,154,381 A | 11/2000 | Kajouke et al. | |
| 6,166,934 A | 12/2000 | Kajouke et al. | |
| 6,586,909 B1 | 7/2003 | Trepka | |
| 8,872,380 B2 | 10/2014 | Shim | |
| 9,300,156 B2 | 3/2016 | Nishibayashi et al. | |
| 9,935,473 B2 * | 4/2018 | Tsurumaru | H02J 3/32 |
| 2013/0030590 A1 * | 1/2013 | Prosser | H02J 3/14 700/295 |
| 2014/0001863 A1 * | 1/2014 | Zhang | G21D 1/02 307/66 |
| 2014/0020244 A1 * | 1/2014 | Carlson | H01L 31/02021 29/825 |
| 2014/0084686 A1 * | 3/2014 | Nishibayashi | H02J 3/32 307/26 |
| 2014/0087285 A1 * | 3/2014 | Kumada | H01M 8/04223 429/444 |

(Continued)

*Primary Examiner* — Adam Houston
(74) *Attorney, Agent, or Firm* — Dority & Manning, P.A.

(57) ABSTRACT

Systems and methods for controlling power distribution are provided. The method includes receiving a power command, wherein the power command requests a discharge from one or more BESS units, and wherein the one or more BESS units are housed in one or more temperature controlled rooms. For each of the one or more temperature controlled rooms, a lowest energy remaining of the one or more BESS units in the temperature controlled room is determined; a low threshold is determined based on the determined lowest energy remaining and a floor; a limit is determined based on the determined low threshold; and the limit is assigned to each of the one or more BESS units housed in the temperature controlled room. The method includes causing the power command to be at least partially satisfied by the one or more BESS units based on the assigned limits.

18 Claims, 16 Drawing Sheets

(56) References Cited

U.S. PATENT DOCUMENTS

| | | | |
|---|---|---|---|
| 2014/0095935 A1* | 4/2014 | Zimmermann | H04L 12/2823 714/33 |
| 2014/0246905 A1* | 9/2014 | Yamazaki | H02J 3/32 307/23 |
| 2014/0288718 A1* | 9/2014 | Nishibayashi | G05B 19/0423 700/286 |
| 2015/0019035 A1* | 1/2015 | Noda | G06Q 50/06 700/291 |
| 2015/0061573 A1* | 3/2015 | Masato | H01M 10/441 320/107 |
| 2015/0063473 A1* | 3/2015 | Nishibayashi | H02J 13/00 375/257 |
| 2015/0073632 A1* | 3/2015 | Hill | B60W 20/10 701/22 |
| 2015/0255999 A1* | 9/2015 | Kim | H02J 7/0042 320/134 |
| 2015/0263546 A1* | 9/2015 | Senoo | H02J 3/32 320/134 |
| 2015/0280628 A1* | 10/2015 | Jacob | H02P 9/04 290/4 D |
| 2015/0357686 A1* | 12/2015 | Lee | H01M 10/637 307/23 |
| 2016/0218511 A1* | 7/2016 | Li | H02J 3/32 |
| 2016/0248110 A1* | 8/2016 | Ghezel-Ayagh | H01M 8/0668 |
| 2017/0104337 A1* | 4/2017 | Drees | H02J 3/32 |
| 2017/0104342 A1* | 4/2017 | ElBsat | H02J 3/32 |
| 2017/0104344 A1* | 4/2017 | Wenzel | H02J 3/32 |
| 2017/0310116 A1* | 10/2017 | Wike | H02J 5/00 |
| 2017/0366037 A1* | 12/2017 | Hicks | H02J 7/34 |
| 2018/0026454 A1* | 1/2018 | Belkacem-Boussaid | G01R 31/3689 702/63 |
| 2018/0034285 A1* | 2/2018 | Baumgartner | H02J 7/0021 |
| 2018/0041037 A1* | 2/2018 | Hidaka | G06Q 50/06 |
| 2018/0062388 A1* | 3/2018 | Mathiesen | H02J 3/14 |
| 2018/0112930 A1* | 4/2018 | Schechner | F01K 3/08 |
| 2018/0195495 A1* | 7/2018 | Williams | F03D 9/007 |
| 2018/0198282 A1* | 7/2018 | Hunt | H02J 9/062 |

* cited by examiner

DISTRIBUTION OF POWER COMMANDS IN AN ENERGY STORAGE SYSTEM

FIELD

The present subject matter relates generally to energy storage systems.

BACKGROUND

Power plants can use battery energy storage system (BESS) units to satisfy requests for power. Power plants can have one or more temperature controlled rooms for storing the BESS units. The temperature of an individual BESS unit can be affected by a charge and/or a discharge applied to the individual BESS unit. If the individual BESS units within a temperature controlled room have too wide a range of temperatures, then it can be difficult to determine an appropriate temperature for the temperature controlled room.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a method for controlling power distribution in an energy storage system. The method includes receiving a power command, wherein the power command requests a discharge or a charge from one or more battery energy storage system (BESS) units, and wherein the one or more BESS units are housed in one or more temperature controlled rooms. For each of the one or more temperature controlled rooms, an energy storage boundary based on the one or more BESS units in the temperature controlled room is determined. For each of the one or more temperature controlled rooms, a threshold is determined based on the determined energy storage boundary and an absolute boundary. For each of the one or more temperature controlled rooms, a limit is determined based on the determined threshold. For each of the one or more temperature controlled rooms, the limit is assigned to each of the one or more BESS units housed in the temperature controlled room. The method includes causing the power command to be at least partially satisfied by the one or more BESS units based on the assigned limits.

Another example aspect of the present disclosure is directed to an energy storage system. The system one or more temperature controlled rooms comprising one or more battery energy storage system (BESS) units. The system includes a controller comprising one or more computing devices. The one or more computing device are configured to receive a power command, wherein the power command requests a discharge or a charge from one or more battery energy storage system (BESS) units. For each of the one or more temperature controlled rooms, the one or more computing devices are configured to determine an energy storage boundary based on the one or more BESS units in the temperature controlled room. For each of the one or more temperature controlled rooms, the one or more computing devices are configured to determine a threshold based on the determined energy storage boundary and an absolute boundary. For each of the one or more temperature controlled rooms, the one or more computing devices are configured to determine a limit based on the determined threshold. For each of the one or more temperature controlled rooms, the one or more computing devices are configured to assign the limit to each of the one or more BESS units housed in the temperature controlled room. The one or more computing devices are configured to cause the power command to be at least partially satisfied by the one or more BESS units based on the assigned limits.

Other example aspects of the present disclosure are directed to systems, methods, power plants, controllers, devices, non-transitory computer-readable media for controlling power distribution. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
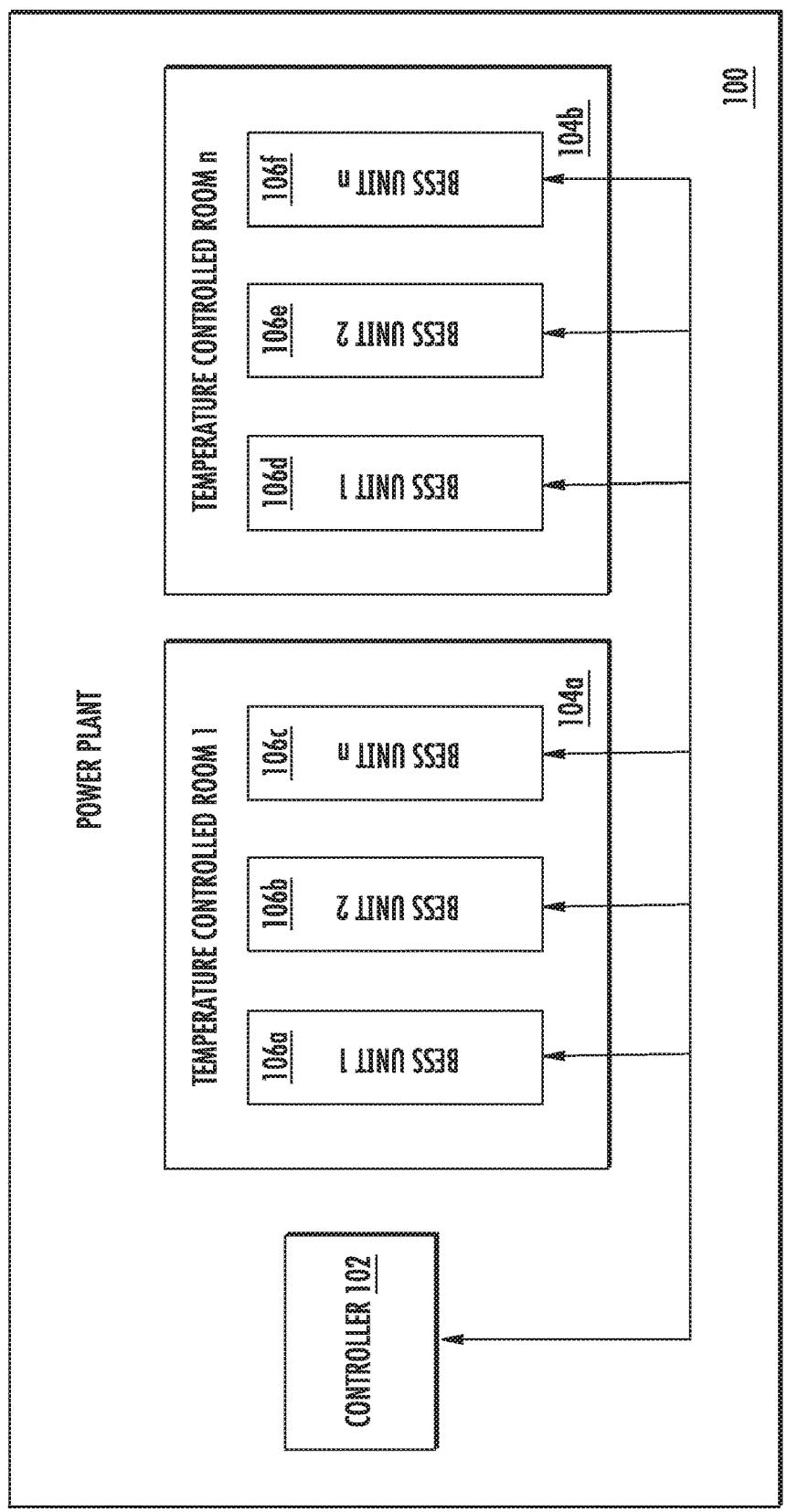
FIG. 1 depicts an example power plant according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to methods and systems for controlling power distribution at a power plant. The power plant can include temperature controlled rooms. The temperature controlled rooms can include battery energy storage system (BESS) units. A temperature of the temperature controlled rooms can be monitored. If the temperature of a temperature controlled room falls outside a range of temperatures appropriate for the BESS units, then the temperature can be adjusted back to the range.

Although the temperatures of the temperature controlled rooms are monitored, the methods and systems disclosed herein may not necessarily monitor the temperatures of the individual BESS units. A temperature of a BESS unit can be affected by energy remaining in and/or energy used by the BESS unit. The power plant can receive a power command. The power plant can include a controller to satisfy the power command. The controller can determine which BESS units should satisfy the power command.

The energy remaining in and/or energy used by the BESS units in a temperature controlled room can be used to determine a threshold, such as the lowest energy remaining and/or the highest energy used of the BESS units in the temperature controlled room. The threshold can be multiplied by a multiplier, such as 2, to determine a limit. Each BESS unit in the temperature controlled room can have the same limit. In such circumstances, all BESS units in the temperature controlled room can have an energy input and/or output under the limit and above the threshold. The controller can direct power commands to BESS units to keep all of the BESS units under the limit and above the threshold, and therefore, with a similar temperature change affected by satisfying the power command.

In this way, the systems and methods according to example aspects of the present disclosure have a technical effect of satisfying cooling requirements by controlling power distribution. More particularly, in the application of BESS units within a power plant, the systems and methods disclosed herein permit a simplified cooling system by influencing the distribution of power commands to BESS units with consideration to cooling requirements. Power command distribution limits are dynamically determined and applied in an effort to keep batteries operating at similar temperatures. In doing so, a single cooling source may be used for BESS units sharing a temperature controlled zone, thereby simplifying the cooling system.

FIG. 1 depicts a block diagram of a power plant 100 according to example embodiments of the present disclosure. The power plant 100 can include a controller 102, one or more temperature controlled room(s) 104a-b, and one or more BESS unit(s) 106a-f. The controller 102 can control energy flow to and from each of the one or more BESS unit(s) 106a-f. The one or more temperature controlled room(s) 104a-b can include the one or more BESS unit(s) 106a-f. The one or more BESS unit(s) 106a-f store energy for consumption by one or more customer(s). The controller 102 can receive a request for energy from the one or more customer(s). The controller 102 can direct the one or more BESS unit(s) to satisfy the received request for energy.

Figure 2:
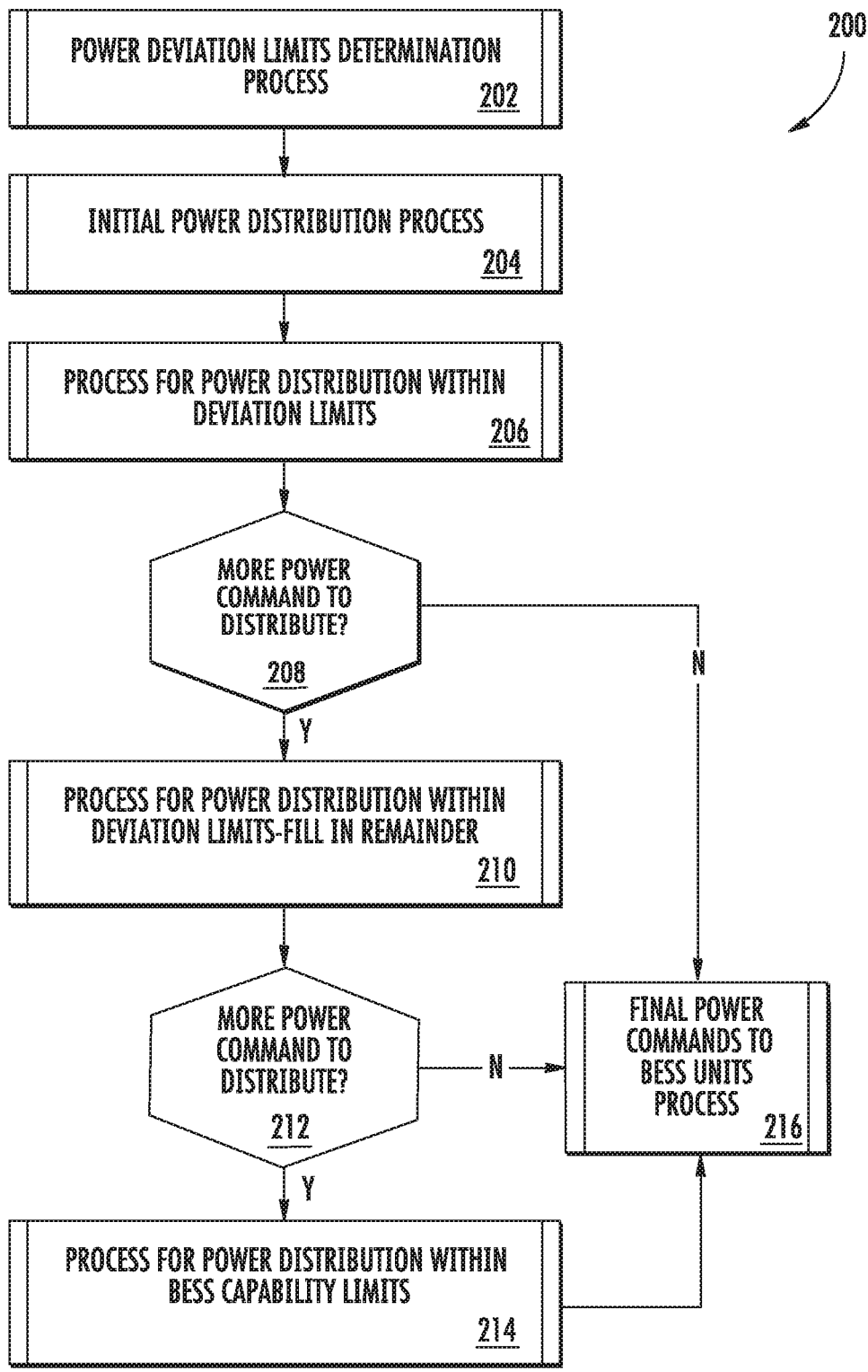
FIG. 2 depicts a flow diagram of an example method according to example embodiments of the present disclosure.

FIG. 2 depicts a flow diagram of an example method (200) for delegating requests for power among BESS units to keep the temperatures of the BESS units in a temperature controlled room within a certain range according to example embodiments of the present disclosure. The method 200 can be performed by a controller of a power plant. At (202), a power deviation limits determination process, which will be described in greater detail in reference to FIGS. 3-8 below, can be performed. At (204), an initial power distribution process, which will be described in greater detail in reference to FIG. 9 below, can be performed. At (206), a process for power distribution with deviation limits, which will be described in greater detail in reference to FIG. 10 below, can be performed. At (208), a decision can be made of if there is more power command to distribute. If so, then the method (200) can advance to (210); and if not, then the method (200) can advance to (216). At (210), a process for power distribution up to the deviation limits, which will be described in greater detail in reference to FIG. 11 below, can be performed. At (212), a decision can be made of if there is more power command to distribute. If so, then the method (200) can advance to (214); and if not, then the method (200) can advance to (216). At (214), a process for power distribution beyond the deviation limits and up to capability limits of the BESS units, described in greater detail in reference to FIG. 12 below, can be performed. At (216), a process to send final power commands to the BESS units, which will be described in greater detail in reference to FIG. 13, can be performed.

Figure 3:
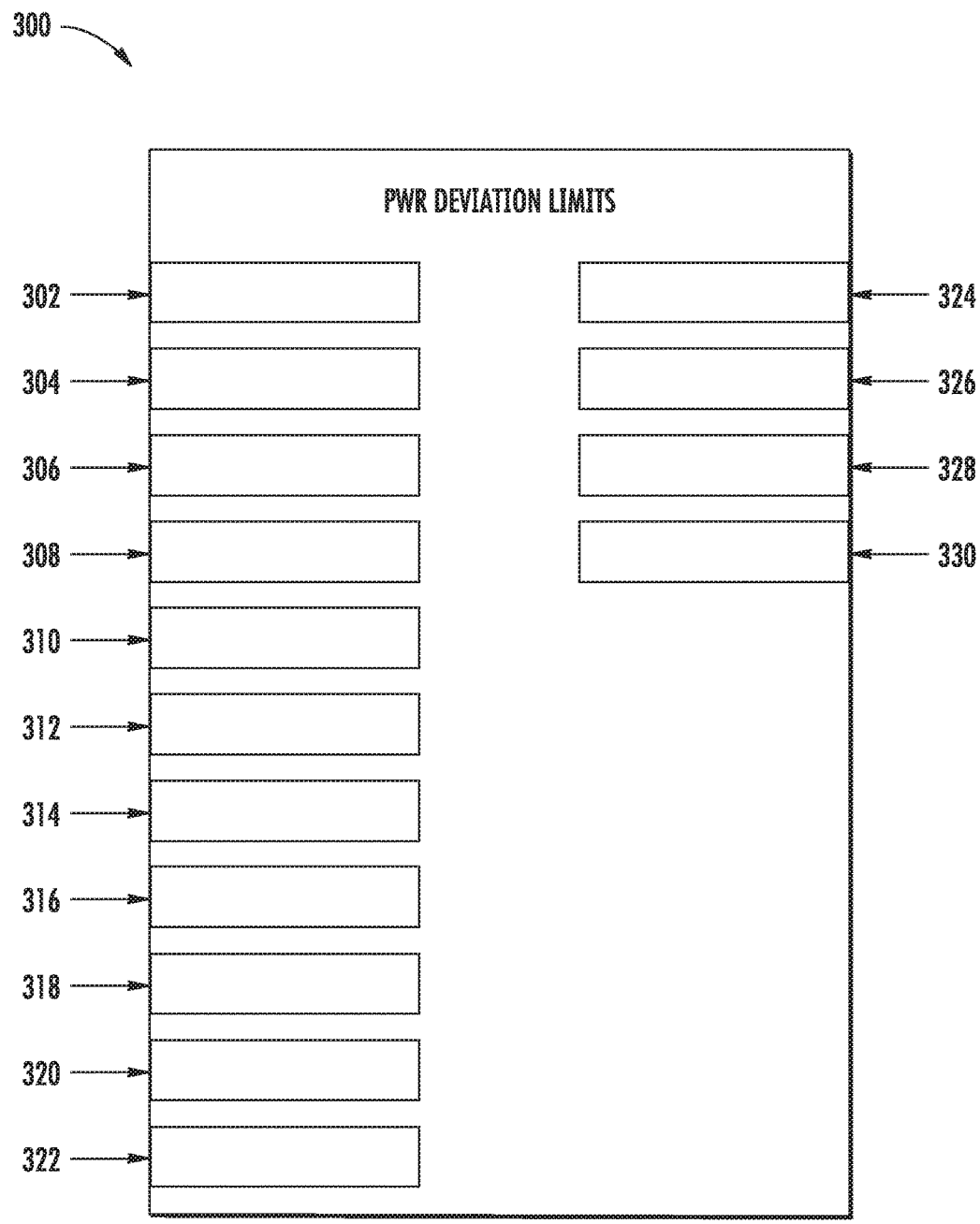
FIG. 3 depicts inputs and outputs of an example method according to example embodiments of the present disclosure.

FIG. 3 depicts inputs and outputs of an example power deviation limits determination process 300. The example power deviation limits determination process 300 can be performed by the controller 102. The example power deviation limits determination process 300 can be performed for each of the one or more temperature controlled room(s) 104a-b. The example power deviation limits determination process 300 can include the following inputs: a power command (PwrCmd 302), an array of values representing energy remaining in each BESS unit of the one or more BESS unit(s) 106a-f in the power plant 100 (EnergyRemaining[i] 304), an array of values representing discharge capabilities of each BESS unit of the one or more BESS unit(s) 106a-f in the power plant 100 (DischCap[i] 306), an array of values representing charge capabilities of each BESS unit of the one or more BESS unit(s) 106a-f in the power plant 100 (ChrgCap[i] 308), an array of values representing energy used by each BESS unit of the one or more BESS unit(s) 106a-f in the power plant 100 (EnergyUsed[i] 310), a value that represents the particular temperature controlled room for which the deviation limits are currently being determined (RoomNumber 312), an array of values representing a particular temperature controlled room in which the BESS unit resides for each of the one or more BESS unit(s) 106a-f in the power plant 100 (BessRoomNums[i] 314), an array of values representing the maximum power deviation limit for each BESS unit of the one or more BESS unit(s) 106a-f in the power plant 100 (RmPwrCmdMaxIn[i] 316), an array of values representing the minimum power deviation limit for each BESS unit of the one or more BESS unit(s) 106a-f in the power plant 100 (RmPwrCmdMinIn[i] 318), an array of values representing availability of the BESS unit for each BESS unit of the one or more BESS unit(s) 106a-f in the power plant 100, an array of values representing availability of each BESS unit of the one or more BESS unit(s) 106*a-f* in the power plant 100 (UnitsAvailable[i] 320), and a floor minimum value which will be used when the actual minimum power deviation limit is lower than the floor minimum value (DevRangeMinLimABS 322). Each BESS unit 106*a-f* in the power plant 100 can correspond to an index common to all input arrays. In that way, when a particular BESS unit is referred to by an index in one array, the particular BESS unit can be referred to in all arrays by the index. In another embodiment, the example power deviation limits determination process 300 can receive different input arrays for each instance the process 300 is executed for a particular temperature controlled room, where the arrays inputted can include the BESS units in the particular temperature controlled room. The values of the inputs can be determined by the controller. The values of the inputs can be based on feedback from the one or more BESS unit(s) 106*a-f*. Values representing energy can be, for example, a unit, such as kilowatt-hours (kWh). Values representing power can be, for example, a unit, such as kilowatt.

The example power deviation limits determination process 300 can include the following outputs: a power command minimum deviation limit for the room (PwrCmdMin 324), a power command maximum for the room (PwrCmdMax 326), an array of values representing the maximum power deviation limit for each BESS unit of the one or more BESS unit(s) 106*a-f* in the power plant 100 (RmPwrCmdMaxOut[i] 328), and an array of values representing the minimum power deviation limit for each BESS unit of the one or more BESS unit(s) 106*a-f* in the power plant 100 (RmPwrCmdMinOut[i] 330). RmPwrCmdMaxIn[i] 316 can be the same as RmPwrCmdMaxOut[i] 328 except that the indices in RmPwrCmdMaxOut[i] 328 that correspond to a BESS unit in the temperature controlled room for which the example power deviation limits determination process 300 executes are updated with the PwrCmdMax 326 value. RmPwrCmdMinIn[i] 318 can be the same as RmPwrCmdMinOut[i] 330 except that the indices in RmPwrCmdMinOut[i] 330 that correspond to a BESS unit in the temperature controlled room for which the example power deviation limits determination process 300 executes are updated with the PwrCmdMin 324 value. Each BESS unit 106*a-f* in the power plant 100 can correspond to an index common to all output arrays. In that way, when a particular BESS unit is referred to by an index in one array, the particular BESS unit can be referred to in all arrays by the index. Values representing power can be, for example, a unit, such as kilowatt.

Figure 4:
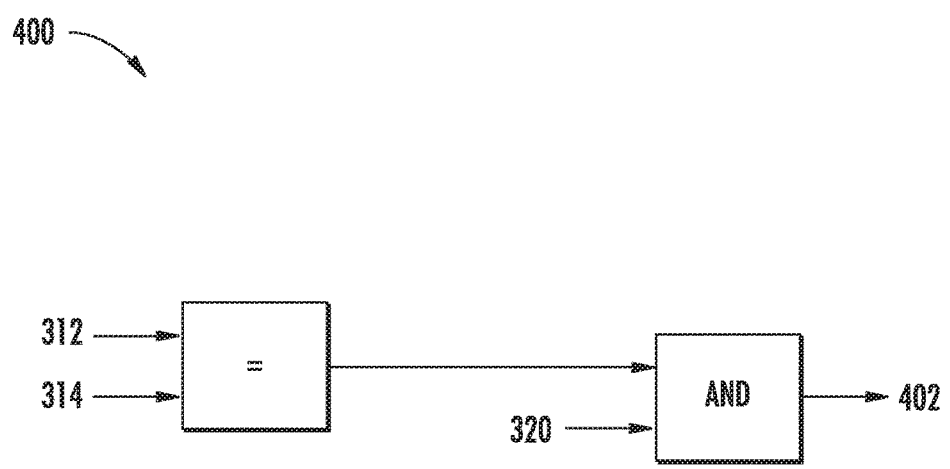
FIG. 4 depicts an example process according to example embodiments of the present disclosure.

FIG. 4 depicts a first example subprocess 400 of the example power deviation limits determination process 300. In the first example subprocess 400, the room number of a particular temperature controlled room being considered (RoomNumber 312) is compared against the value in BessRoomNums[i] 314 for each BESS unit of the one or more BESS unit(s) 106*a-f* in the power plant 100. For each BESS unit found to be in the particular temperature controlled room, UnitsAvailable[i] 320 is checked to see if the BESS unit is available. UnitsAvailableInRm[i] 402 receives a "true" if the corresponding BESS unit is in the room and available, and a "false" otherwise. In other embodiments, the Booleans "true" and "false" can be replaced with "1" and "0" or any other meaningful way of providing distinct classifications.

Figure 5:
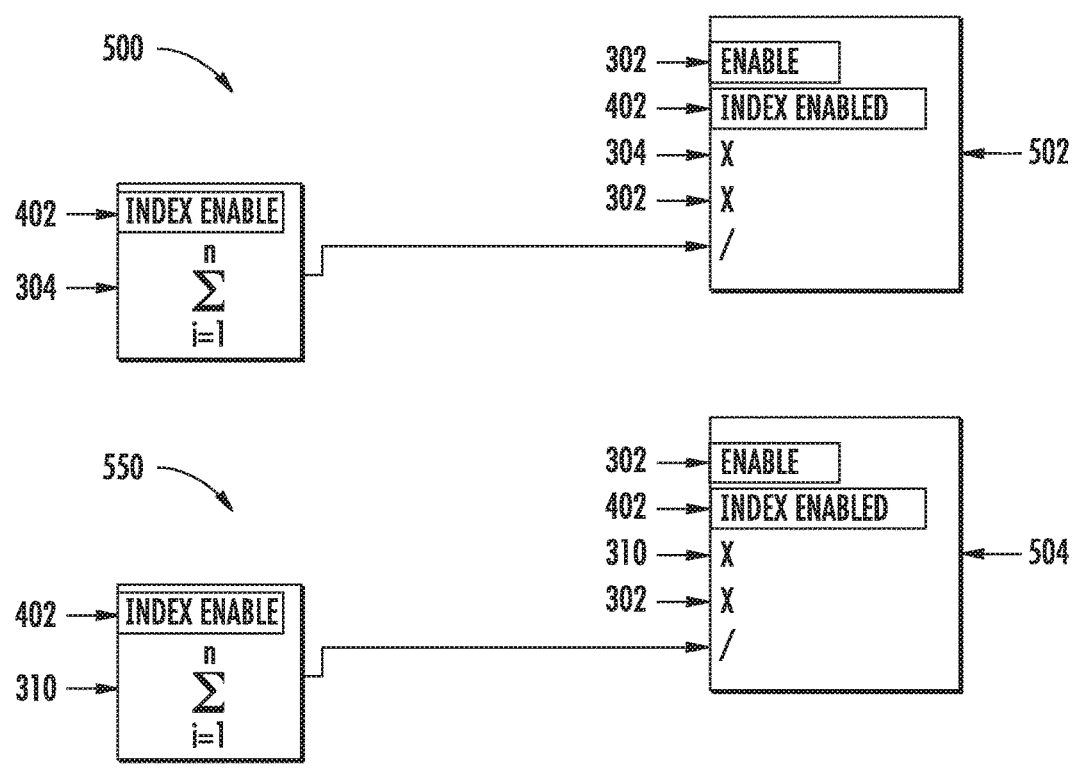
FIG. 5 depicts example processes according to example embodiments of the present disclosure.

FIG. 5 depicts second example subprocesses 500 and 550 of the example power deviation limits determination process 300. Subprocess 500 executes when the power command (PwrCmd 302) is a discharge request. The energy remaining from each BESS unit (EnergyRemaining[i] 304) which was found to be in the room and available in subprocess 400 (UnitsAvailableInRm[i] 402) is summed. Then the energy remaining for a particular BESS unit (EnergyRemaining[i] 304) is multiplied by a power needed to satisfy the power command (PwrCmd 302) and then divided by the sum. The result is stored (e.g., loaded, entered, etc.) at an index corresponding with the particular BESS unit in an array for the portion of the power command which each BESS unit will satisfy (OutBess_InitDischDist[i] 502). The same is done for each BESS unit which was found to be in the room and available in subprocess 400. As a homogenous example, BESS units 1, 2, 3, 4, and 5 can be found to be in the particular temperature controlled room being considered and available. Each of the BESS units can have a 1000 kWh energy capacity. Each of the BESS units can have a remaining energy of 500 kWh. The power command can be a 2000 kW discharge. Under such circumstances, the following entries can be made into OutBess_InitDischDist[i] 502:

OutBess_InitDischDist[1] 502=(500 kWh*2000 kW)/(500 kWh+500 kWh+500 kWh+500 kWh+500 kWh)=400 kW.

OutBess_InitDischDist[2] 502=(500 kWh*2000 kW)/(500 kWh+500 kWh+500 kWh+500 kWh+500 kWh)=400 kW.

OutBess_InitDischDist[3] 502=(500 kWh*2000 kW)/(500 kWh+500 kWh+500 kWh+500 kWh+500 kWh)=400 kW.

OutBess_InitDischDist[4] 502=(500 kWh*2000 kW)/(500 kWh+500 kWh+500 kWh+500 kWh+500 kWh)=400 kW.

OutBess_InitDischDist[5] 502=(500 kWh*2000 kW)/(500 kWh+500 kWh+500 kWh+500 kWh+500 kWh)=400 kW.

As a heterogeneous example, BESS units 1, 2, 3, 4, and 5 can be found to be in the particular temperature controlled room being considered and available. BESS unit 1 can have a remaining energy of 100 kWh. BESS unit 2 can have a remaining energy of 200 kWh. BESS unit 3 can have a remaining energy of 300 kWh. BESS unit 4 can have a remaining energy of 400 kWh. BESS unit 5 can have a remaining energy of 500 kWh. Each of the BESS units can have a 1000 kWh energy capacity. The power command can be a 2000 kW discharge. Under such circumstances, the following entries can be made into OutBess_InitDischDist[i] 502:

OutBess_InitDischDist[1] 502=(100 kWh*2000 kW)/(100 kWh+200 kWh+300 kWh+400 kWh+500 kWh)=133.3333 kW.

OutBess_InitDischDist[2] 502=(200 kWh*2000 kW)/(100 kWh+200 kWh+300 kWh+400 kWh+500 kWh)=266.6667 kW.

OutBess_InitDischDist[3] 502=(300 kWh*2000 kW)/(100 kWh+200 kWh+300 kWh+400 kWh+500 kWh)=400 kW.

OutBess_InitDischDist[4] 502=(400 kWh*2000 kW)/(100 kWh+200 kWh+300 kWh+400 kWh+500 kWh)=533.3333 kW.

OutBess_InitDischDist[5] 502=(500 kWh*2000 kW)/(100 kWh+200 kWh+300 kWh+400 kWh+500 kWh)=666.6667 kW.

Subprocess 550 executes when the power command (PwrCmd 302) is a charge request. The energy used by each BESS unit (EnergyUsed[i] 310) which was found to be in the room and available in subprocess 400 (UnitsAvailableInRm[i] 402) is summed. Then the energy used by a particular BESS unit (EnergyUsed[i] 310) is multiplied by the power needed to satisfy the power command (PwrCmd 302) and then divided by the sum. The result is stored at an index corresponding with the particular BESS unit in an array for the portion of the power command which each BESS unit will satisfy (OutBess_InitChrgDist[i] 504). The same is done for each BESS unit which was found to be in the room and available in subprocess 400. As a homogenous example, BESS units 1, 2, 3, 4, and 5 can be found to be in the particular temperature controlled room being considered and available. Each of the BESS units can have a 1000 kWh energy capacity. Each of the BESS units can have used 500 kWh. The power command can be a 2000 kW charge. Under such circumstances, the following entries can be made into OutBess_InitChrgDist[i] 504:

OutBess_InitChrgDist[1] 504=(500 kWh*−2000 kW)/(500 kWh+500 kWh+500 kWh+500 kWh+500 kWh)=−400 kW.

OutBess_InitChrgDist[2] 504=(500 kWh*−2000 kW)/(500 kWh+500 kWh+500 kWh+500 kWh+500 kWh)=−400 kW.

OutBess_InitChrgDist[3] 504=(500 kWh*−2000 kW)/(500 kWh+500 kWh+500 kWh+500 kWh+500 kWh)=−400 kW.

OutBess_InitChrgDist[4] 504=(500 kWh*−2000 kW)/(500 kWh+500 kWh+500 kWh+500 kWh+500 kWh)=−400 kW.

OutBess_InitChrgDist[5] 504=(500 kWh*−2000 kW)/(500 kWh+500 kWh+500 kWh+500 kWh+500 kWh)=−400 kW.

As a heterogeneous example, BESS units 1, 2, 3, 4, and 5 can be found to be in the particular temperature controlled room being considered and available. BESS unit 1 can have used 100 kWh of energy. BESS unit 2 can have used 200 kWh of energy. BESS unit 3 can have used 300 kWh of energy. BESS unit 4 can have used 400 kWh of energy. BESS unit 5 can have used 500 kWh of energy. The power command can be a 2000 kW charge. Under such circumstances, the following entries can be made into OutBess_InitChrgDist[i] 504:

OutBess_InitChrgDist[1] 504=(100 kWh*−2000 kW)/(100 kWh+200 kWh+300 kWh+400 kWh+500 kWh)=−133.3333 kW.

OutBess_InitChrgDist[2] 504=(200 kWh*−2000 kW)/(100 kWh+200 kWh+300 kWh+400 kWh+500 kWh)=−266.6667 kW.

OutBess_InitChrgDist[3] 504=(300 kWh*−2000 kW)/(100 kWh+200 kWh+300 kWh+400 kWh+500 kWh)=−400 kW.

OutBess_InitChrgDist[4] 504=(400 kWh*−2000 kW)/(100 kWh+200 kWh+300 kWh+400 kWh+500 kWh)=−533.3333 kW.

OutBess_InitChrgDist[5] 504=(500 kWh*−2000 kW)/(100 kWh+200 kWh+300 kWh+400 kWh+500 kWh)=−666.6667 kW.

Figure 6:
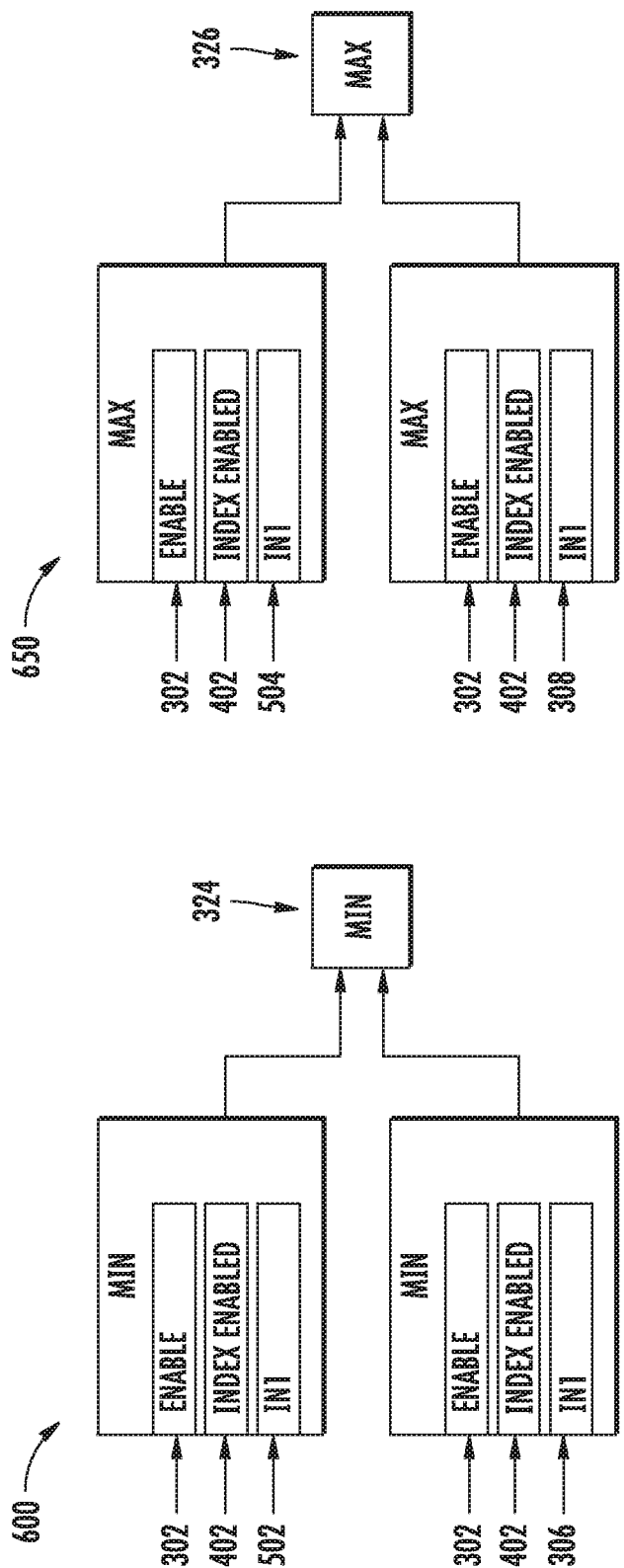
FIG. 6 depicts example processes according to example embodiments of the present disclosure.

FIG. 6 depicts third example subprocesses 600 and 650 of the example power deviation limits determination process 300. Subprocess 600 executes when the power command (PwrCmd 302) is a discharge request. For each BESS unit which was found to be in the room and available in subprocess 400 (UnitsAvailableInRm[i] 402), the corresponding entry in OutBess_InitDischDist[i] 502 retrieved and the minimum of the retrieved entries from OutBess_InitDischDist[i] 502 is determined. In the homogeneous example above, the determined minimum initial discharge is 400 kW. In the heterogeneous example above, the determined minimum initial discharge is 133.3333 kW. Also, for each BESS unit which was found to be in the room and available in subprocess 400 (UnitsAvailableInRm[i] 402), the corresponding entry in DischCap[i] 306 retrieved and the minimum of the retrieved entries from DischCap[i] 306 is determined. Then the determined minimum initial discharge is compared with the determined minimum discharge capabilities and the lower value is stored as PwrCmdMin 324.

Subprocess 650 executes when the power command (PwrCmd 302) is a charge request. For each BESS unit which was found to be in the room and available in subprocess 400 (UnitsAvailableInRm[i] 402), the corresponding entry in OutBess_InitChrgDist[i] 504 retrieved and the maximum of the retrieved entries from OutBess_InitChrgDist[i] 504 is determined. In the homogeneous example above, the determined maximum initial charge is 400 kW. In the heterogeneous example above, the determined maximum initial charge is 133.3333 kW. Also, for each BESS unit which was found to be in the room and available in subprocess 400 (UnitsAvailableInRm[i] 402), the corresponding entry in ChrgCap[i] 308 retrieved and the maximum of the retrieved entries from ChrgCap[i] 308 is determined. Then the determined maximum initial charge is compared with the determined maximum charge capabilities and the higher value is stored as PwrCmdMax 326.

Figure 7:
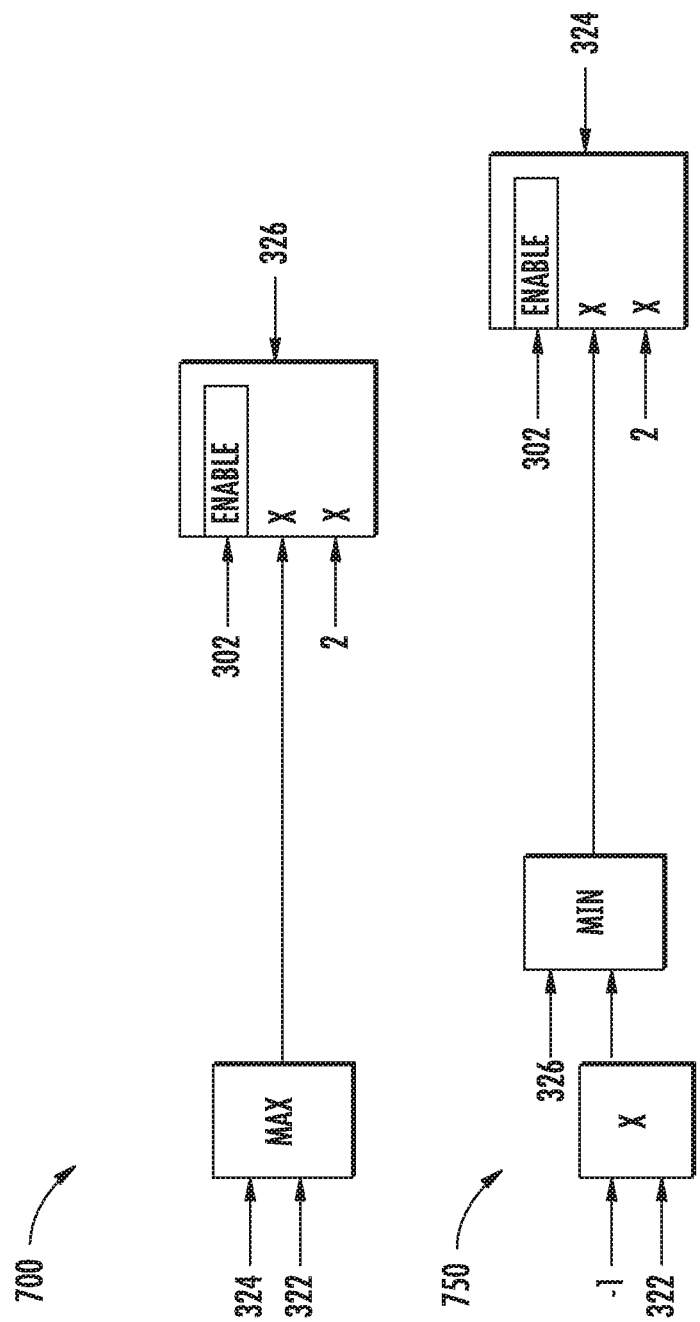
FIG. 7 depicts example processes according to example embodiments of the present disclosure.

FIG. 7 depicts fourth example subprocesses 700 and 750 of the example power deviation limits determination process 300. Subprocess 700 executes when the power command (PwrCmd 302) is a discharge request. The PwrCmdMin 324 determined in subprocess 600 can be compared with the floor minimum value (DevRangeMinLimABS 322) and the larger value can be multiplied by a multiplier (e.g., factor, etc.), such as 2, and stored as PwrCmdMax 326. In another embodiment, a formula can be used in place of the multiplier. Subprocess 750 executes when the power command (PwrCmd 302) is a charge request. The PwrCmdMax 326 determined in subprocess 650 can be compared with the ceiling maximum value (DevRangeMinLimABS 322*−1) and the smaller value can be multiplied by a multiplier, such as 2, and stored as PwrCmdMin 324. In another embodiment, a formula can be used in place of the multiplier.

Figure 8:
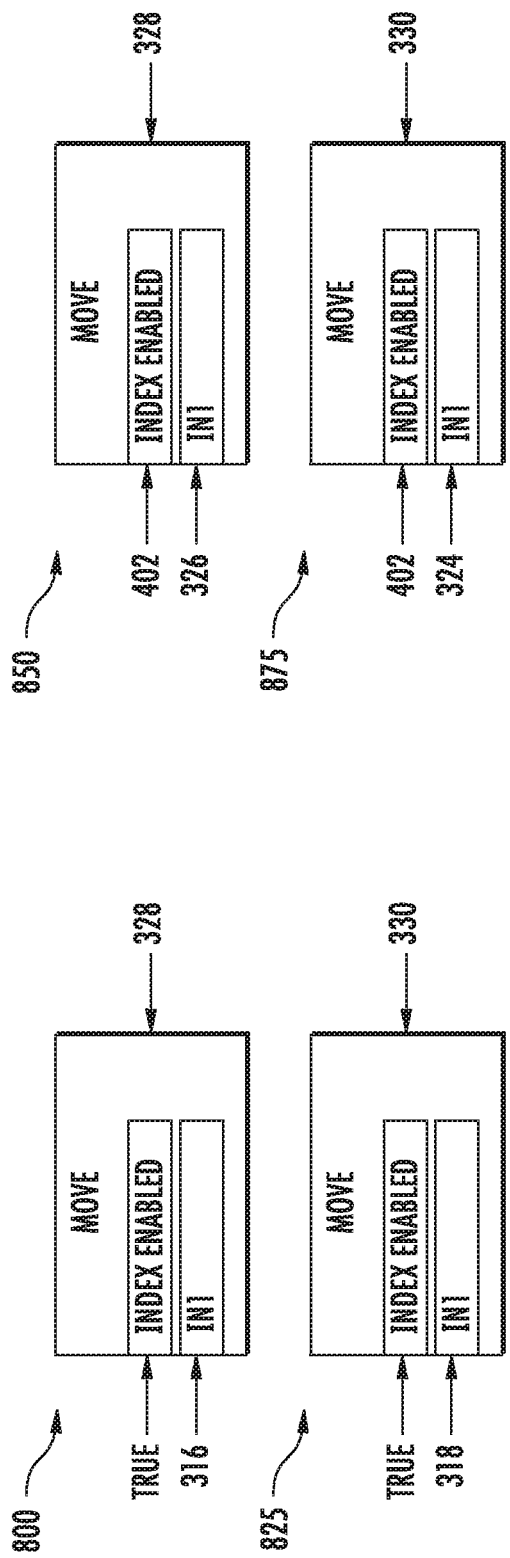
FIG. 8 depicts example processes according to example embodiments of the present disclosure.

FIG. 8 depicts fifth example subprocesses 800, 825, 850, 875 of the example power deviation limits determination process 300. Subprocess 800 loads every entry from RmPwrCmdMaxIn[i] 316 into RmPwrCmdMaxOut[i] 328.

Subprocess 825 loads every entry from RmPwrCmdMinIn[i] 318 into RmPwrCmdMinOut[i] 330. For each BESS unit which was found to be in the room and available in subprocess 400 (UnitsAvailableInRm[i] 402), the corresponding entry in RmPwrCmdMaxOut[i] 328 is loaded with PwrCmdMax 326 at subprocess 850. For each BESS unit which was found to be in the room and available in subprocess 400 (UnitsAvailableInRm[i] 402), the corresponding entry in RmPwrCmdMinOut[i] 330 is loaded with PwrCmdMin 324 at subprocess 875.

Figure 9:
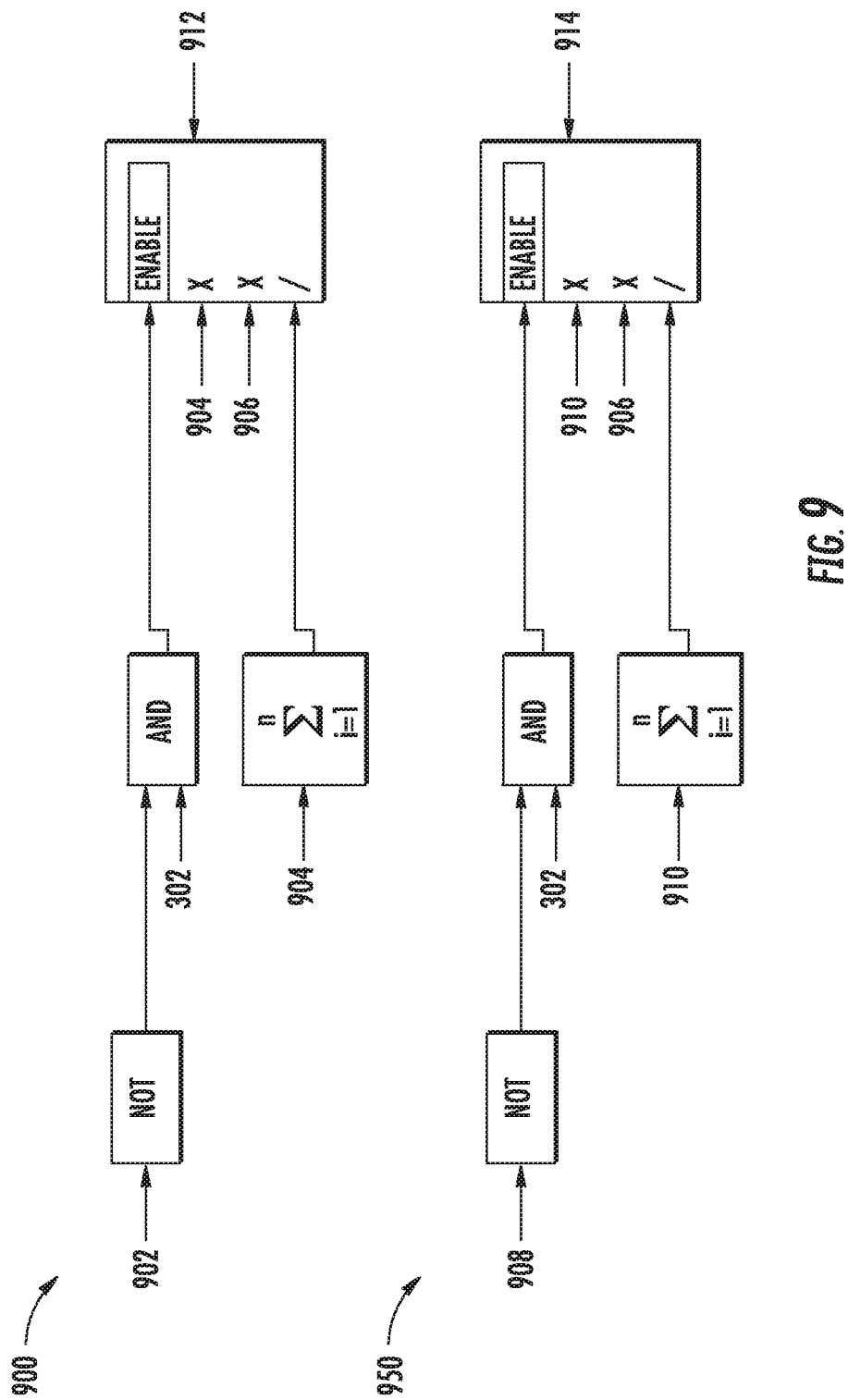
FIG. 9 depicts example processes according to example embodiments of the present disclosure.

FIG. 9 depicts initial power distribution processes 900 and 950. Process 900 executes when the power command (PwrCmd 302) is a discharge request. First, a check is made to see if discharge contribution is disabled (DischContDisabled 902). If not, then the energy remaining in all of the BESS units (BessEnergyRemaining[i] 904) can be summed.

The energy remaining in a particular BESS unit (BessEnergyRemaining[i] 904) can be multiplied by the power of the power command that has not been satisfied (PwrRegDmd 906) and the resulting product can be divided by the sum and stored in a corresponding index for the particular BESS unit in InitialDischDist[i] 912. Process 900 can be performed for all BESS units in the power plant.

Process 950 executes when the power command (PwrCmd 302) is a charge request. First, a check is made to see if charge contribution is disabled (ChrgContDisabled 908). If not, then the energy used by all of the BESS units (BessEnergyUsed[i] 910) can be summed. The energy used by a particular BESS unit (BessEnergyUsed[i] 910) can be multiplied by the power of the power command that has not been satisfied (PwrRegDmd 906) and the resulting product can be divided by the sum and stored in a corresponding index for the particular BESS unit in InitialChrgDist[i] 914. Process 950 can be performed for all BESS units in the power plant.

Figure 10:
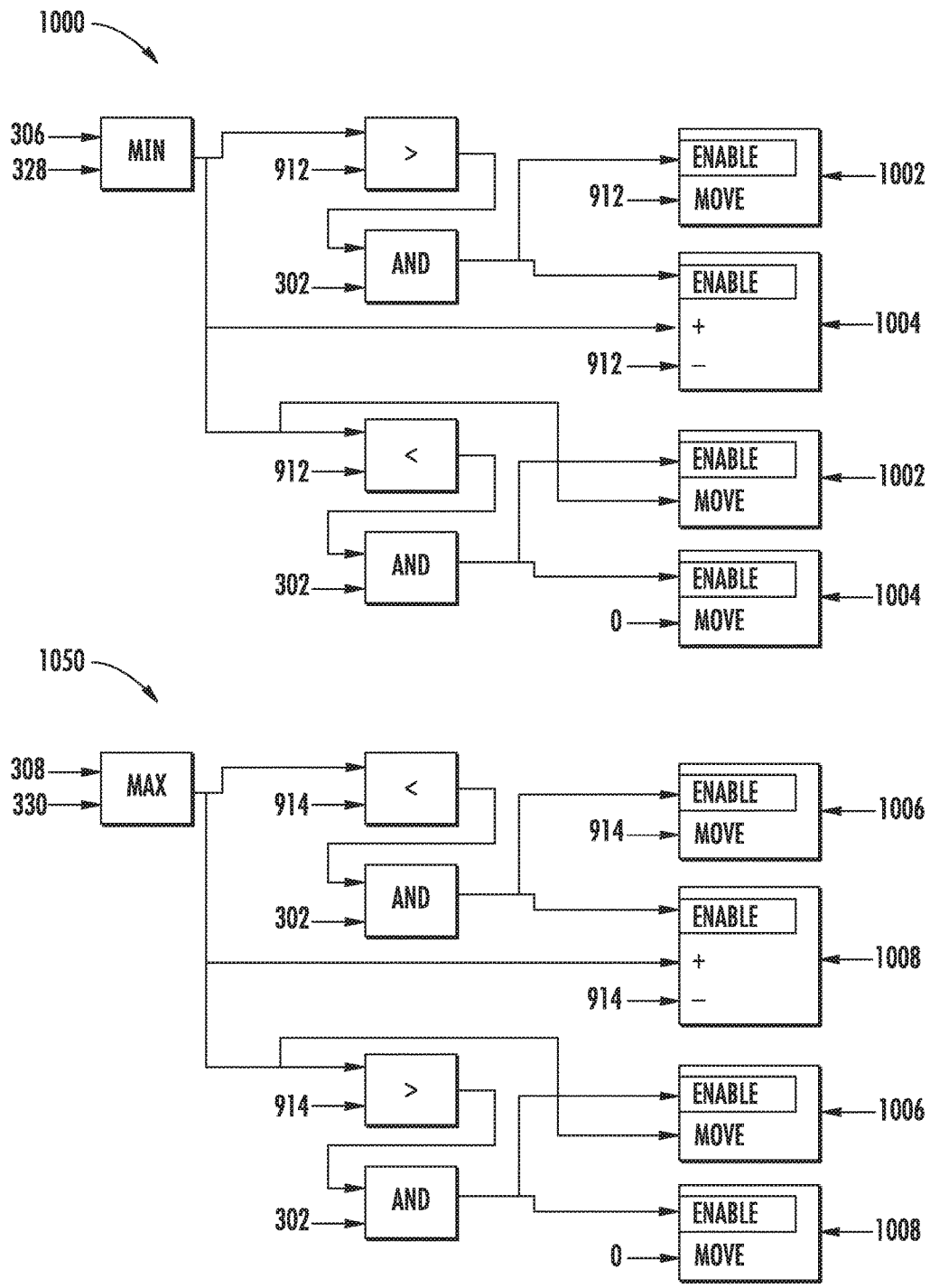
FIG. 10 depicts example processes according to example embodiments of the present disclosure.

FIG. 10 depicts processes for power distribution within deviation limits 1000 and 1050. Process 1000 executes when the power command (PwrCmd 302) is a discharge request. First, the RmPwrCmdMaxOut[i] 328 for a particular BESS unit loaded in subprocess 800 or subprocess 850 is compared with the discharge capacity of the particular BESS unit (DischCap[i] 306) and a minimum value can be determined. The determined minimum value can be compared with the InitialDischDist[i] 912 determined for the particular BESS unit in process 900. If the determined minimum value is greater than the InitialDischDist[i] 912 value for the particular BESS unit, then the InitialDischDist[i] 912 value for the particular BESS unit can be stored in an array 1stStageDischPwr[i] 1002 at an index for the particular BESS unit and the InitialDischDist[i] 912 value for the particular BESS unit can be subtracted from the determined minimum value and the result can be stored in an array 1stStageDischRemainder[i] 1004 at an index for the particular BESS unit. If the determined minimum value is less than the InitialDischDist[i] 912 value for the particular BESS unit, then the determined minimum value can be stored in an array 1stStageDischPwr[i] 1002 at an index for the particular BESS unit and "0" can be stored in an array 1stStageDischRemainder[i] 1004 at an index for the particular BESS unit. Process 1000 can be performed for all BESS units in the power plant.

Process 1050 executes when the power command (PwrCmd 302) is a charge request. First, the RmPwrCmdMinOut[i] 330 for a particular BESS unit loaded in subprocess 825 or subprocess 875 is compared with the charge capacity of the particular BESS unit (ChrgCap[i] 308) and a maximum value can be determined. The determined maximum value can be compared with the InitialChrgDist[i] 914 determined for the particular BESS unit in process 950. If the determined maximum value is less than the InitialChrgDist[i] 914 value for the particular BESS unit, then the InitialChrgDist[i] 914 value for the particular BESS unit can be stored in an array 1stStageChrgPwr[i] 1006 at an index for the particular BESS unit and the InitialChrgDist[i] 914 value for the particular BESS unit can be subtracted from the determined maximum value and the result can be stored in an array 1stStageChrgRemainder[i] 1008 at an index for the particular BESS unit. If the determined maximum value is greater than the InitialChrgDist[i] 914 value for the particular BESS unit, then the determined maximum value can be stored in an array 1stStageChrgPwr[i] 1006 at an index for the particular BESS unit and "0" can be stored in an array 1stStageChrgRemainder[i] 1008 at an index for the particular BESS unit. Process 1050 can be performed for all BESS units in the power plant.

Figure 11:
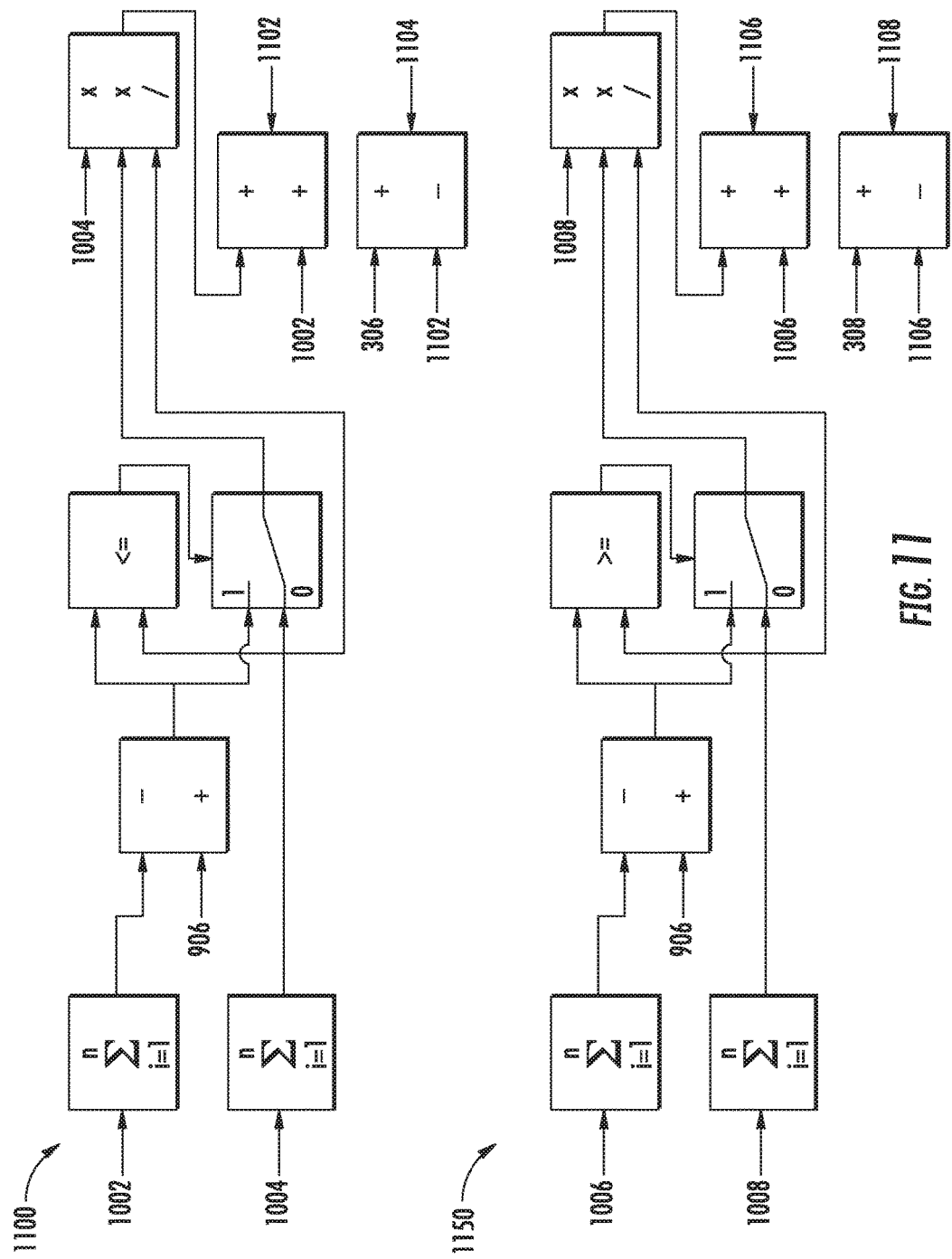
FIG. 11 depicts example processes according to example embodiments of the present disclosure.

FIG. 11 depicts processes for power distribution up to the deviation limits 1100 and 1150. Process 1100 executes when the power command (PwrCmd 302) is a discharge request. All values in the 1stStageDischPwr[i] 1002 array that were loaded in process 1000 can be summed to a first total and the first total can be subtracted from the power of the power command (PwrRegDmd 906) and the result can be a second total. All values in the 1stStageDischRemainder[i] 1004 array that were loaded in process 1000 can be summed to a third total. If the second total is less than or equal to the third total, then the value of 1stStageDischRemainder[i] 1004 associated with a particular BESS unit can be multiplied with the second total and divided by the third total to form a fourth total. If the second total is greater than the third total, then the value of 1stStageDischRemainder[i] 1004 associated with a particular BESS unit can be the fourth total. The fourth total can be added to a value of 1stStageDischPwr[i] 1002 at an index associated with the particular BESS unit and the result can be stored in an array 2ndStageDischPwr[i] 1102 at an index associated with the particular BESS unit. The value of 2ndStageDischPwr[i] 1102 associated with an index associated with the particular BESS unit can be subtracted from the value of PwrDischCap[i] 306 associated with an index associated with the particular BESS unit and the result can be stored in an array 2ndStageDischRemainder[i] 1104 at an index associated with the particular BESS unit. Process 1100 can be performed for all BESS units in the power plant.

Process 1150 executes when the power command (PwrCmd 302) is a charge request. All values in the 1stStageChrgPwr[i] 1006 array that were loaded in process 1050 can be summed to a first total and the first total can be subtracted from the power of the power command (PwrRegDmd 906) and the result can be a second total. All values in the 1stStageChrgRemainder[i] 1008 array that were loaded in process 1050 can be summed to a third total. If the second total is greater than or equal to the third total, then the value of 1 stStageChrgRemainder[i] 1008 associated with a particular BESS unit can be multiplied with the second total and divided by the third total to form a fourth total. If the second total is less than the third total, then the value of 1stStageChrgRemainder[i] 1008 associated with a particular BESS unit can be the fourth total. The fourth total can be added to a value of 1stStageChrgPwr[i] 1006 at an index associated with the particular BESS unit and the result can be stored in an array 2ndStageChrgPwr[i] 1106 at an index associated with the particular BESS unit. The value of 2ndStageChrgPwr[i] 1106 associated with an index associated with the particular BESS unit can be subtracted from the value of PwrChrgCap[i] 308 associated with an index associated with the particular BESS unit and the result can be stored in an array 2ndStageChrgRemainder[i] 1108 at an index associated with the particular BESS unit. Process 1150 can be performed for all BESS units in the power plant.

Figure 12:
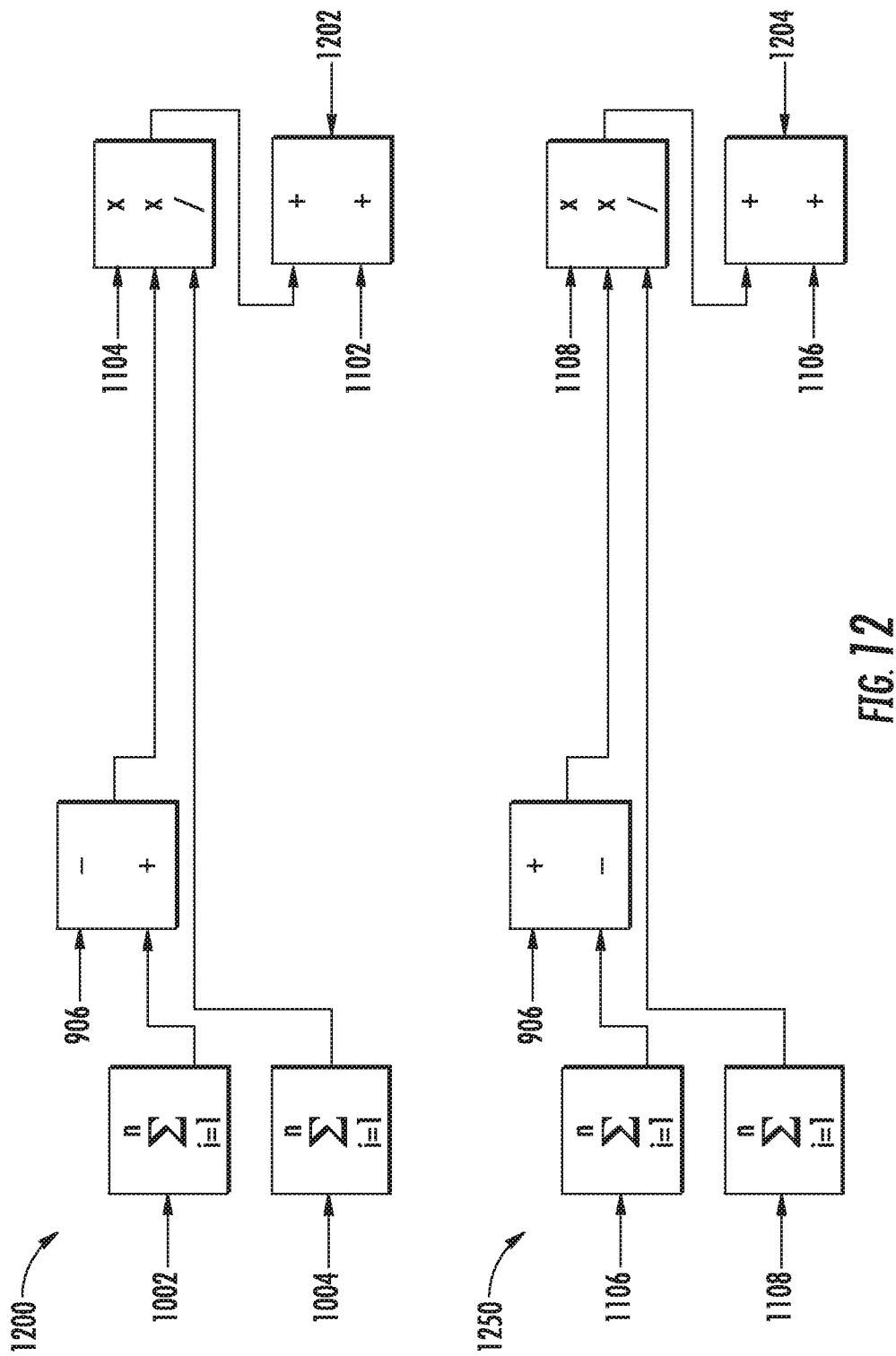
FIG. 12 depicts example processes according to example embodiments of the present disclosure.

FIG. 12 depicts processes 1200 and 1250 for power distribution beyond the deviation limits and up to capability limits of the BESS units. Process 1200 executes when the power command (PwrCmd 302) is a discharge request. All values in the 2ndStageDischPwr[i] 1102 array that were loaded in process 1100 can be summed to a first total and the first total can be subtracted from the power of the power command (PwrRegDmd 906) and the result can be a second total. All values in the 2ndStageDischRemainder[i] 1104 array that were loaded in process 1100 can be summed to a third total. The value of 2ndStageDischRemainder[i] 1104 associated with a particular BESS unit can be multiplied with the second total and divided by the third total to form a fourth total. The fourth total can be added to the value of 2ndStageDischPwr[i] 1102 associated with the particular BESS unit and the result can be stored in OutBess_DischPwr[i] 1202 at an index associated with the particular BESS unit. Process 1200 can be performed for all of the BESS units in the power plant.

Process 1250 executes when the power command (PwrCmd 302) is a charge request. All values in the 2ndStageChrgPwr[i] 1106 array that were loaded in process 1150 can be summed to a first total and the first total can be subtracted from the power of the power command (PwrRegDmd 906) and the result can be a second total. All values in the 2ndStageChrgRemainder[i] 1108 array that were loaded in process 1150 can be summed to a third total. The value of 2ndStageChrgRemainder[i] 1108 associated with a particular BESS unit can be multiplied with the second total and divided by the third total to form a fourth total. The fourth total can be added to the value of 2ndStageChrgPwr[i] 1106 associated with the particular BESS unit and the result can be stored in OutBess_ChrgPwr[i] 1204 at an index associated with the particular BESS unit. Process 1250 can be performed for all of the BESS units in the power plant.

Figure 13:
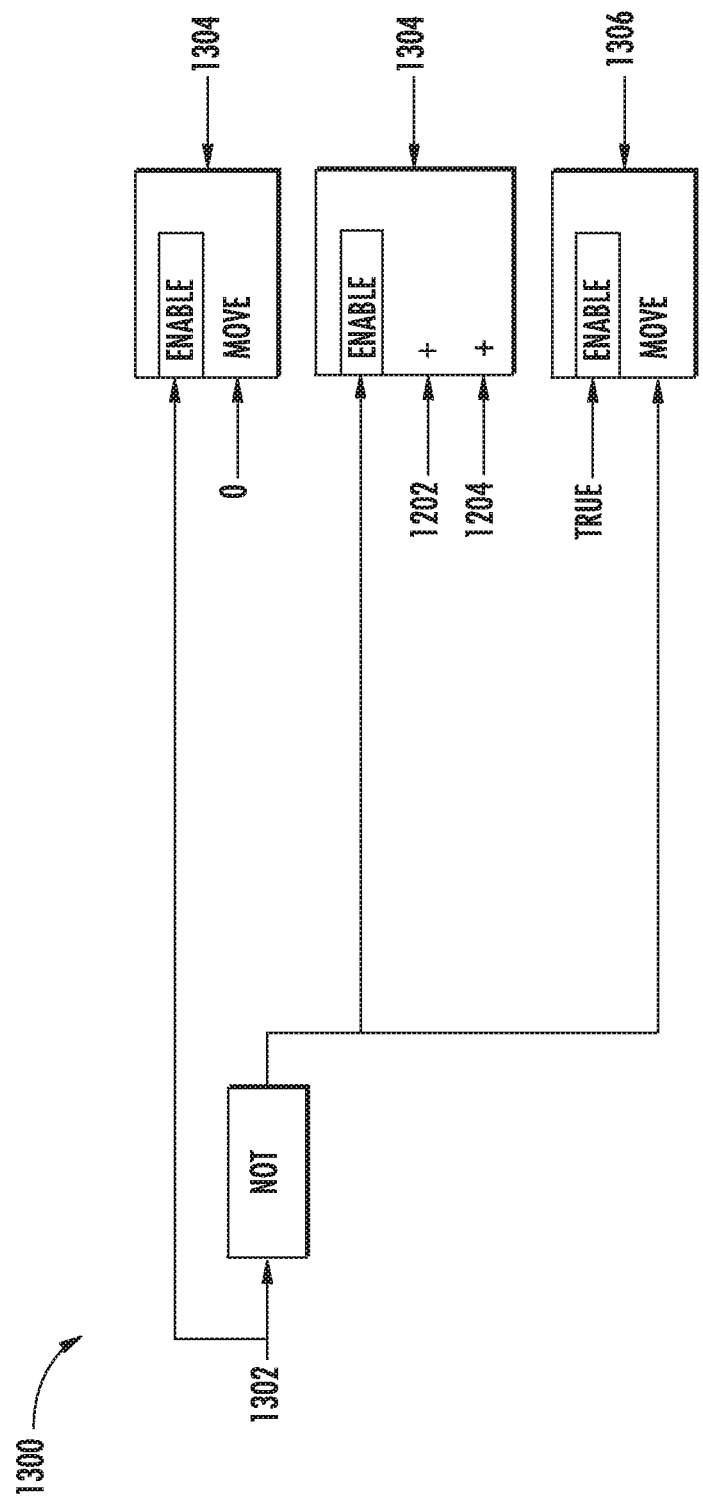
FIG. 13 depicts an example process according to example embodiments of the present disclosure.

FIG. 13 depicts a process 1300 to send final power commands to the BESS units. In the process 1300, a signal (PwrRegPreset 1302) representing a pre-set state of an energy savings performance contracts (ESPC) power regulator. If the PwrRegPreset 1302 signal is true, then "0" can be entered into an array OutBess_PwrDmd[i] 1304 at an index associated with the BESS unit. If the PwrRegPreset 1302 signal is false, then the value entered in OutBess_DischPwr[i] 1202 during process 1200 for the particular BESS unit can be added to the value entered in OutBess_ChrgPwr [i] 1204 during process 1250 for the particular BESS unit and the result can be stored in OutBess_PwrDmd[i] 1304 at an index associated with the particular BESS unit. The inverted value of the 1302 signal can be stored in OutBess_PwrDmdEn[i] 1306 at an index associated with the particular BESS unit. Process 1300 can be performed for all of the BESS units in the power plant.

Figure 14:
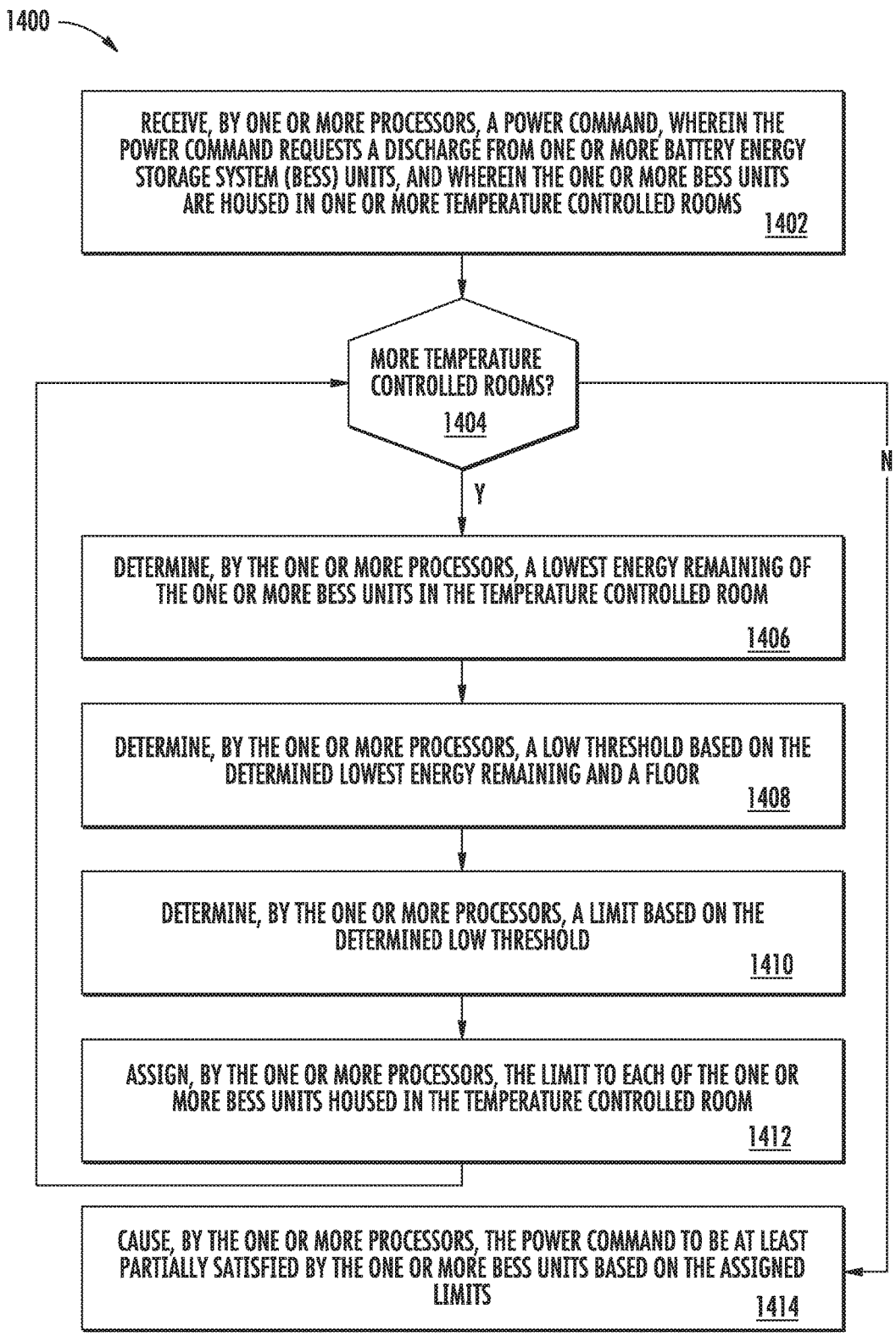
FIG. 14 depicts a flow diagram of an example method according to example embodiments of the present disclosure.

FIG. 14 depicts a flow diagram of an example method (1400) for controlling power distribution according to example embodiments of the present disclosure. The method (1400) can be performed by a controller at a power plant. At (1402), a power command can be received. The power command can request a discharge from one or more battery energy storage system (BESS) units. The one or more BESS units can be housed in one or more temperature controlled rooms. At (1404), a check can be made of if there are more temperature controlled rooms. If there are, the method (1400) can move to (1406); otherwise, the method can move to (1414). At (1406), an energy storage boundary of the one or more BESS units in the temperature controlled room can be determined. More specifically, a lowest energy remaining of the one or more BESS units in the temperature controlled room can be determined. At (1408), a threshold can be determined based on the determined energy storage boundary and an absolute boundary. More specifically, a low threshold can be determined based on the determined lowest energy remaining and a floor. At (1410), a limit can be determined based on the determined low threshold. Determining the limit based on the determined low threshold can comprise multiplying the low threshold by a multiplier. In an embodiment, the multiplier can be 2. In another embodiment, a formula can be used in place of the multiplier. At (1412), the limit can be assigned to each of the one or more BESS units housed in the temperature controlled room. At (1414), the power command can be caused to be at least partially satisfied by the one or more BESS units based on the assigned limits.

Optionally, a limit capacity can be determined for each of the one or more BESS units to satisfy the power command without reaching the corresponding assigned limit. A portion of the power command can be assigned to at least one of the one or more BESS units based on the limit capacity. The assigned portion can be based on a proportional capacity of the at least one of the one or more BESS units compared to a sum of limit capacities for all BESS units of the one or more BESS units. A limit capacity can be determined for each of the one or more BESS units to satisfy additional discharge requests without exceeding the corresponding assigned limit. A limit capacity can be determined for each of the one or more BESS units to satisfy additional discharge requests without reaching the corresponding assigned limit. The determined limit capacities can be summed to determine a total limit capacity. The power command can be determined to be not fully satisfied. A remaining power portion can be determined. For each of the one or more BESS units, a limit capacity proportion can be determined based on a respective limit capacity and the total limit capacity. A power proportion can be assigned to each of the one or more BESS units based on a respective limit capacity proportion and the remaining power portion. The one or more BESS units can be caused to at least partially satisfy the remaining power portion based on a respective assigned power proportion. An absolute capacity can be determined for each of the one or more BESS units. An absolute capacity can be a capacity beyond which a BESS unit cannot satisfy. The determined absolute capacities can be summed to determine a total absolute capacity. The remaining power portion can be determined to be not fully satisfied. A second remaining power portion can be determined. For each of the one or more BESS units, an absolute capacity proportion can be determined based on a respective absolute capacity and the total absolute capacity. A power share can be assigned to each of the one or more BESS units based on a respective absolute capacity proportion and the second remaining power portion. The one or more BESS units can be caused to at least partially satisfy the second remaining power portion based on a respective assigned power share.

Figure 15:
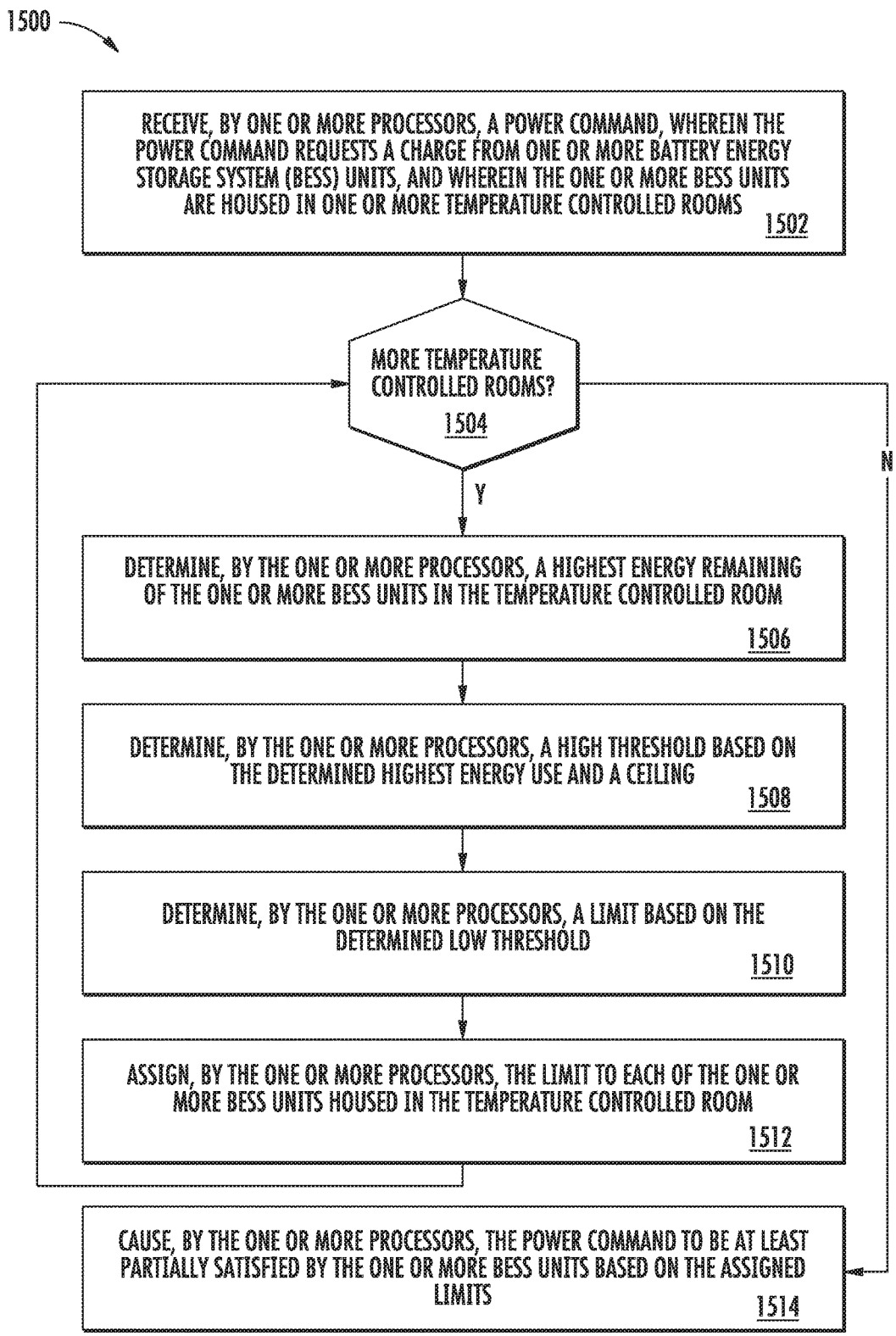
FIG. 15 depicts a flow diagram of an example method according to example embodiments of the present disclosure.

FIG. 15 depicts a flow diagram of an example method (1500) for controlling power distribution according to example embodiments of the present disclosure. The method (1500) can be performed by a controller at a power plant. At (1502), a power command can be received. The power command can request a charge from one or more battery energy storage system (BESS) units. The one or more BESS units can be housed in one or more temperature controlled rooms. At (1504), a check can be made of if there are more temperature controlled rooms. If there are, the method (1500) can move to (1506); otherwise, the method can move to (1514). At (1506), an energy storage boundary of the one or more BESS units in the temperature controlled room can be determined. More specifically, a highest energy used of the one or more BESS units in the temperature controlled room can be determined. At (1508), a threshold can be determined based on the determined energy storage boundary and an absolute boundary. More specifically, a high threshold can be determined based on the determined highest energy used and a ceiling. At (1510), a limit can be determined based on the determined high threshold. Determining the limit based on the determined high threshold can comprise multiplying the high threshold by a multiplier. In an embodiment, the multiplier can be 2. In another embodiment, a formula can be used in place of the multiplier. At (1512), the limit can be assigned to each of the one or more BESS units housed in the temperature controlled room. At (1514), the power command can be caused to be at least partially satisfied by the one or more BESS units based on the assigned limits.

Optionally, a limit capacity can be determined for each of the one or more BESS units to satisfy the power command without reaching the corresponding assigned limit. A portion of the power command can be assigned to at least one of the one or more BESS units based on the limit capacity. The assigned portion can be based on a proportional capacity of the at least one of the one or more BESS units compared to a sum of limit capacities for all BESS units of the one or more BESS units. A limit capacity can be determined for each of the one or more BESS units to satisfy additional charge requests without exceeding the corresponding assigned limit. A limit capacity can be determined for each of the one or more BESS units to satisfy additional charge requests without reaching the corresponding assigned limit. The determined limit capacities can be summed to determine a total limit capacity. The power command can be determined to be not fully satisfied. A remaining power portion can be determined. For each of the one or more BESS units, a limit capacity proportion can be determined based on a respective limit capacity and the total limit capacity. A power proportion can be assigned to each of the one or more BESS units based on a respective limit capacity proportion and the remaining power portion. The one or more BESS units can be caused to satisfy the remaining power portion based on a respective assigned power proportion. An absolute capacity can be determined for each of the one or more BESS units. An absolute capacity can be a capacity beyond which a BESS unit cannot satisfy. The determined absolute capacities can be summed to determine a total absolute capacity. The remaining power portion can be determined to be not fully satisfied. A second remaining power portion can be determined. For each of the one or more BESS units, an absolute capacity proportion can be determined based on a respective absolute capacity and the total absolute capacity. A power share can be assigned to each of the one or more BESS units based on a respective absolute capacity proportion and the second remaining power portion. The one or more BESS units can be caused to at least partially satisfy the second remaining power portion based on a respective assigned power share.

Figure 16:
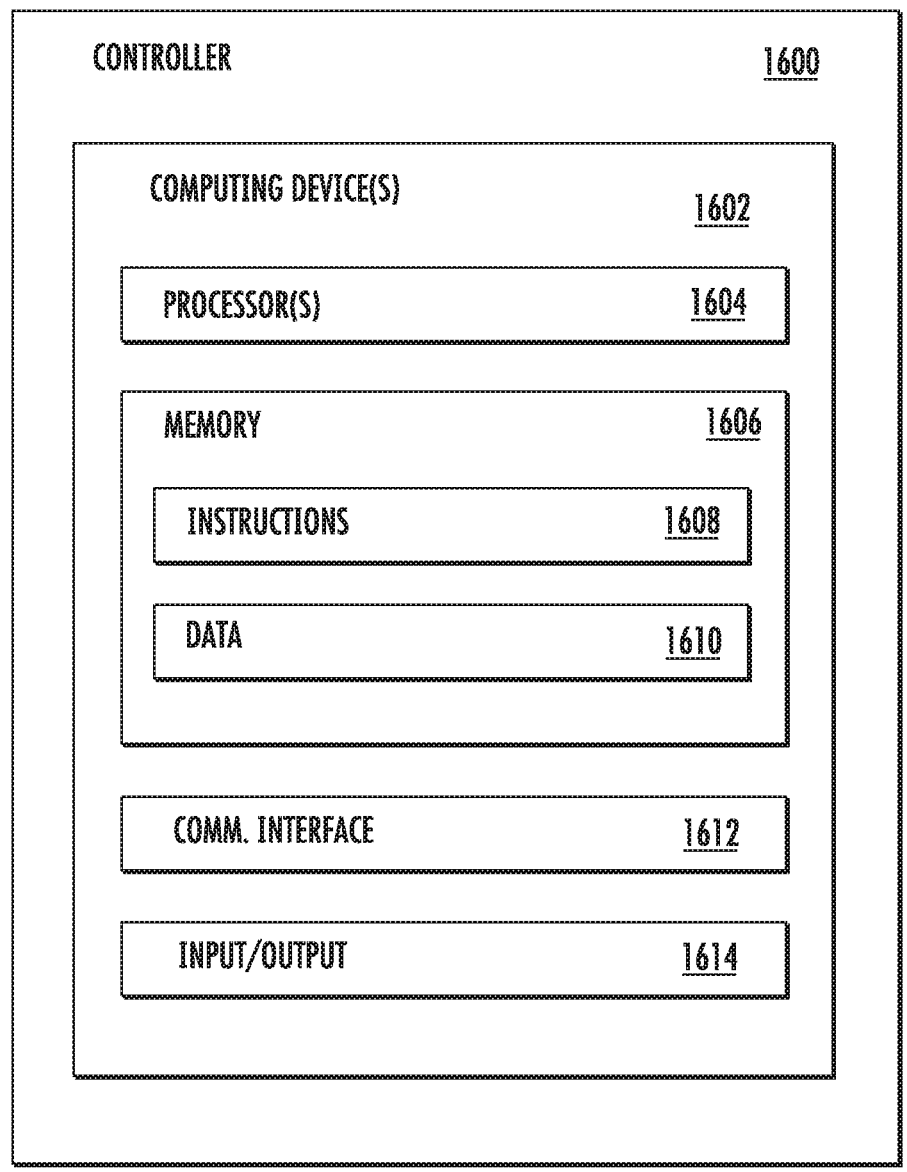
FIG. 16 depicts a computing system for implementing one or more aspects according to example embodiments of the present disclosure.

FIG. 16 depicts a block diagram of an example computing system that can be used to implement a controller 1600, such as controller 102, or other systems according to example embodiments of the present disclosure. As shown, the controller 1600 can include one or more computing device(s) 1602. The one or more computing device(s) 1602 can include one or more processor(s) 1604 and one or more memory device(s) 1606. The one or more processor(s) 1604 can include any suitable processing device, such as a microprocessor, microcontroller, integrated circuit, logic device, or other suitable processing device. The one or more memory device(s) 1606 can include one or more computer-readable media, including, but not limited to, non-transitory computer-readable media, RAM, ROM, hard drives, flash drives, or other memory devices.

The one or more memory device(s) 1606 can store information accessible by the one or more processor(s) 1604, including computer-readable instructions 1608 that can be executed by the one or more processor(s) 1604. The instructions 1608 can be any set of instructions that when executed by the one or more processor(s) 1604, cause the one or more processor(s) 1604 to perform operations. The instructions 1608 can be software written in any suitable programming language or can be implemented in hardware. In some embodiments, the instructions 1608 can be executed by the one or more processor(s) 1604 to cause the one or more processor(s) 1604 to perform operations, such as the operations for controlling operation of BESS units to satisfy power commands, as described with reference to FIGS. 2-15, and/or any other operations or functions of the one or more computing device(s) 1602.

The memory device(s) 1606 can further store data 1610 that can be accessed by the processors 1604. For example, the data 1610 can include a data associated with operation of BESS units, such as capacity, deviation limits, current use, current demand, etc., as described herein. The data 1610 can include one or more table(s), function(s), algorithm(s), model(s), equation(s), etc. according to example embodiments of the present disclosure.

The one or more computing device(s) 1602 can also include a communication interface 1612 used to communicate, for example, with the other components of system. The communication interface 1612 can include any suitable components for interfacing with one or more network(s), including for example, transmitters, receivers, ports, controllers, antennas, or other suitable components.

The one or more computing device(s) 1602 can include input and/or output devices 1614. For example, the input and/or output device(s) 1614 can include a keyboard, joystick, multi-way rocker switches, mouse, trackball, touch screen, touch pad, data entry keys, a microphone suitable for voice recognition, a display device and/or any other suitable device.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling power distribution in an energy storage system comprising:

receiving, by one or more processors, a power command, wherein the power command requests a discharge or a charge from one or more battery energy storage system (BESS) units, and wherein the one or more BESS units are housed in one or more temperature controlled rooms;

for each of the one or more temperature controlled rooms:

determining, by the one or more processors, an energy storage boundary based on the one or more BESS units in the temperature controlled room;

determining, by the one or more processors, a threshold based on the determined energy storage boundary and an absolute boundary;
determining, by the one or more processors, a limit based on the determined threshold; and
assigning, by the one or more processors, the limit to each of the one or more BESS units housed in the temperature controlled room; and
causing, by the one or more processors, the power command to be at least partially satisfied by the one or more BESS units based on the assigned limits.

2. The method of claim 1, wherein the power command requests a discharge, the energy storage boundary is a lowest energy remaining of the one or more BESS units in the temperature controlled room, the threshold is a low threshold, and the absolute boundary is a floor.

3. The method of claim 2, wherein determining, by the one or more processors, the limit based on the determined threshold further comprises multiplying the low threshold by a multiplier.

4. The method of claim 3, wherein causing the power command to be at least partially satisfied by the one or more BESS units further comprises:
determining a limit capacity for each of the one or more BESS units to satisfy the power command without reaching the corresponding assigned limit; and
assigning a portion of the power command to at least one of the one or more BESS units based on the limit capacity.

5. The method of claim 4, wherein the assigned portion is based on a proportional capacity of the at least one of the one or more BESS units compared to a sum of limit capacities for all BESS units of the one or more BESS units.

6. The method of claim 3, further comprising:
determining a limit capacity for each of the one or more BESS units to satisfy additional discharge requests without exceeding the corresponding assigned limit; and
summing the determined limit capacities to determine a total limit capacity.

7. The method of claim 6, further comprising:
determining the power command was not fully satisfied;
determining a remaining power portion;
for each of the one or more BESS units, determining a limit capacity proportion based on a respective limit capacity and the total limit capacity;
assigning a power proportion to each of the one or more BESS units based on a respective limit capacity proportion and the remaining power portion; and
causing the one or more BESS units to at least partially satisfy the remaining power portion based on a respective assigned power proportion.

8. The method of claim 7, further comprising:
determining an absolute capacity for each of the one or more BESS units; and
summing the determined absolute capacities to determine a total absolute capacity.

9. The method of claim 8, further comprising:
determining the remaining power portion is not fully satisfied;
determining a second remaining power portion;
for each of the one or more BESS units, determining an absolute capacity proportion based on a respective absolute capacity and the total absolute capacity;
assigning a power share to each of the one or more BESS units based on a respective absolute capacity proportion and the second remaining power portion; and
causing the one or more BESS units to at least partially satisfy the second remaining power portion based on a respective assigned power share.

10. The method of claim 1, wherein the power command requests a charge, the energy storage boundary is a highest energy used of the one or more BESS units in the temperature controlled room, the threshold is a high threshold, and the absolute boundary is a ceiling.

11. The method of claim 10, wherein determining, by the one or more processors, a limit based on the determined threshold further comprises multiplying the high threshold by a multiplier.

12. The method of claim 11, wherein causing the power command to be satisfied by the one or more BESS units further comprises:
determining a limit capacity for each of the one or more BESS units to satisfy the power command without reaching the corresponding assigned limit; and
assigning a portion of the power command to at least one of the one or more BESS units based on the limit capacity.

13. The method of claim 12, wherein the assigned portion is based on a proportional capacity of the at least one of the one or more BESS units compared to a sum of limit capacities for all BESS units of the one or more BESS units.

14. The method of claim 11, further comprising:
determining a limit capacity for each of the one or more BESS units to satisfy additional charge requests without exceeding the corresponding assigned limit; and
summing the determined limit capacities to determine a total limit capacity.

15. The method of claim 14, further comprising:
receiving a second power command, wherein the second power command requests a charge from the one or more BESS units;
for each of the one or more BESS units, determining a limit capacity proportion based on a respective limit capacity and the total limit capacity;
assigning a power proportion to each of the one or more BESS units based on a respective limit capacity proportion and the second power command; and
causing each of the one or more BESS units to satisfy the second power command based on a respective assigned power proportion.

16. The method of claim 15, further comprising:
determining an absolute capacity for each of the one or more BESS units; and
summing the determined absolute capacities to determine a total absolute capacity.

17. The method of claim 16, further comprising:
receiving a third power command, wherein the third power command requests a charge from the one or more BESS units;
for each of the one or more BESS units, determining an absolute capacity proportion based on a respective absolute capacity and the total absolute capacity;
assigning a power share to each of the one or more BESS units based on a respective absolute capacity proportion and the third power command; and
causing each of the one or more BESS units to satisfy the third power command based on a respective assigned power share.

18. A power plant, comprising:
one or more temperature controlled rooms comprising one or more battery energy storage system (BESS) units; and a controller comprising one or more computing devices, the one or more computing devices configured to:
receive a power command, wherein the power command requests a discharge or a charge from one or more BESS units;
for each of the one or more temperature controlled rooms:
determine an energy storage boundary based on the one or more BESS units in the temperature controlled room;
determine a threshold based on the determined energy storage boundary and an absolute boundary;
determine a limit based on the determined threshold; and
assign the limit to each of the one or more BESS units housed in the temperature controlled room; and
cause the power command to be at least partially satisfied by the one or more BESS units based on the assigned limits.

* * * * *